United States Patent [19]

Carlson

[11] 4,399,861
[45] Aug. 23, 1983

[54] CASTING GAP CONTROL SYSTEM
[75] Inventor: Charles E. Carlson, Succasunna, N.J.
[73] Assignee: Allied Corporation, Morristown, N.J.
[21] Appl. No.: 219,032
[22] Filed: Dec. 22, 1980

Related U.S. Application Data

[63] Continuation-in-part of Ser. No. 74,348, Sep. 11, 1979, abandoned.

[51] Int. Cl.³ .................. B22D 11/16; B22D 11/00; B22D 11/10; G01B 11/02
[52] U.S. Cl. .................. 164/453; 164/155; 164/423; 164/463; 164/488; 356/387
[58] Field of Search .............. 164/452, 453, 423, 437, 164/154, 155, 488; 250/560, 561; 356/375, 381, 384, 385, 386, 387

[56] References Cited

U.S. PATENT DOCUMENTS

| | | | |
|---|---|---|---|
| 3,343,591 | 9/1967 | Lorang | 164/155 |
| 3,522,836 | 8/1970 | King | 164/479 X |
| 3,765,774 | 10/1973 | Petrohilos | 356/387 |
| 3,829,220 | 8/1974 | Parkinson | 356/387 |
| 3,853,406 | 12/1974 | Zanoni | 356/387 |
| 3,854,052 | 12/1974 | Asar et al. | 250/560 |
| 3,856,411 | 12/1974 | Zanoni | 356/386 |
| 3,961,838 | 6/1976 | Zanoni | 350/6.8 |
| 3,992,107 | 11/1976 | Loy | 250/560 X |
| 4,097,158 | 6/1978 | Dehait | 250/560 |
| 4,101,612 | 7/1978 | Barker et al. | 264/22 |

Primary Examiner—Gus T. Hampilos
Assistant Examiner—Jerold L. Johnson
Attorney, Agent, or Firm—James Riesenfeld; Gerhard H. Fuchs

[57] ABSTRACT

A non-contact, optical method is provided for controlling a gap between a crucible orifice and a rapidly moving chill surface during casting of metal strip. The method comprises setting a desired value for the gap; measuring the gap by continually scanning it with a light beam; generating a deviation signal that indicates whether there is a difference between the measured and desired values; and using the deviation signal to adjust the crucible position so as to minimize the difference. In a preferred embodiment, the light beam is provided by a laser.

10 Claims, 5 Drawing Figures

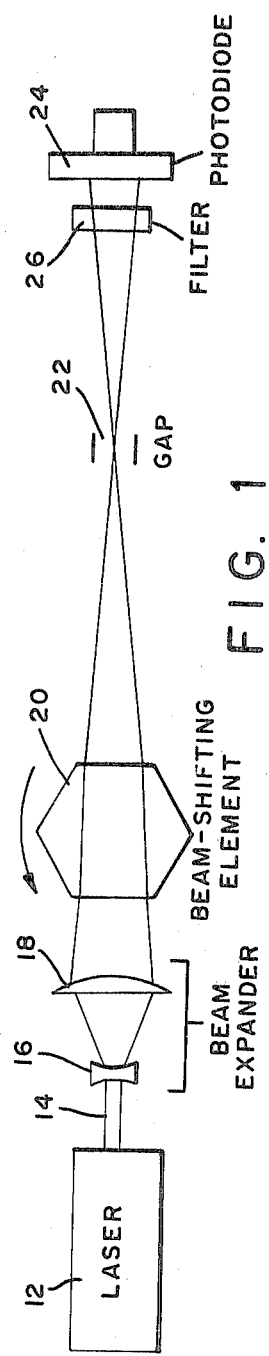
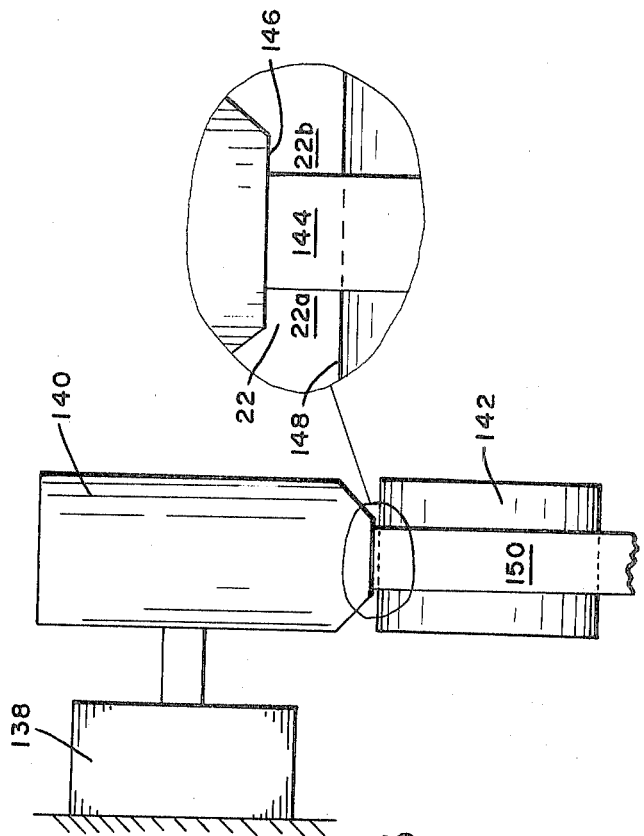

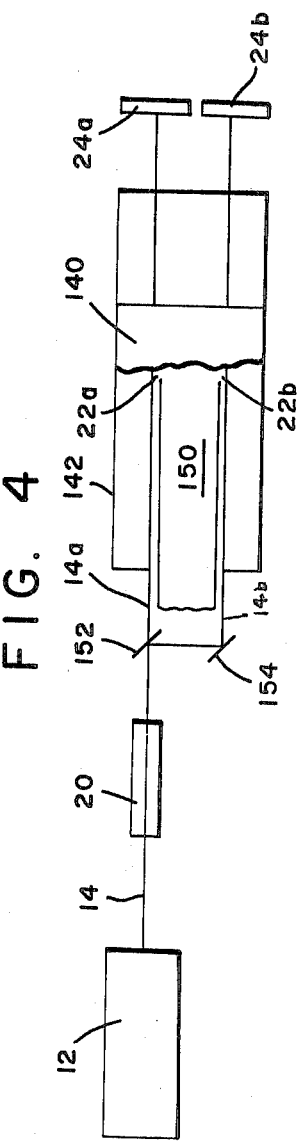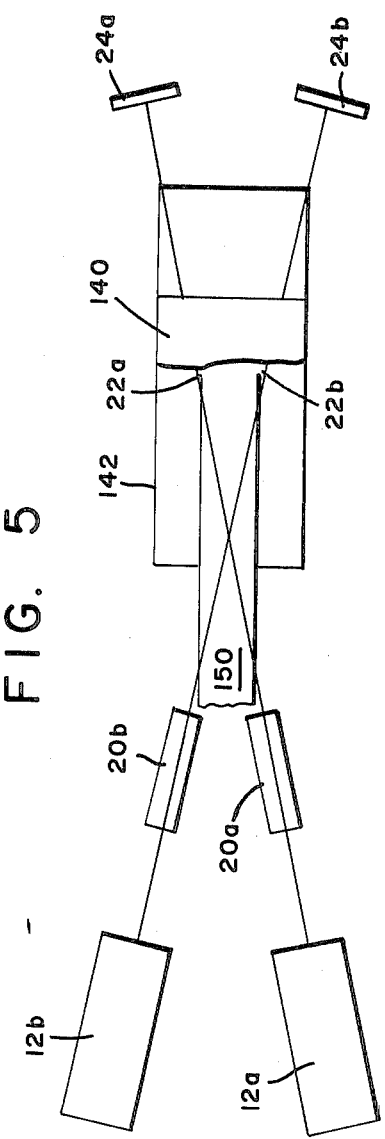

CASTING GAP CONTROL SYSTEM

CROSS REFERENCE TO PRIOR APPLICATIONS

This application is a continuation-in-part of application Ser. No. 074,348, filed Sept. 11, 1979, and now abandoned, and is related to application Ser. No. 192,746, filed in the name of C. E. Carlson and G. S. Kath on Oct. 1, 1980.

BACKGROUND OF THE INVENTION

1. Field of the Invention

The present invention relates to an optical/mechanical method of controlling the gap between a metal-casting crucible orifice and an adjacent chill surface.

2. Description of the Prior Art

In the process of flow casting of liquid alloys to obtain glassy metal strip, the spacing between crucible orifice and casting wheel surface has to be closely controlled in order to obtain homogeneous strip. High temperatures and surface speeds in this region rule out conventional contact-type measuring devices and, instead, necessitate remote measurement and control.

Zanoni in U.S. Pat. No. 3,853,406 discloses a differential, optical, non-contacting diameter gauge utilizing a pair of linearly scanning light beams sequentially scanning the test piece. The two parallel, offset scanning laser beams are produced by reflecting two laser beams, separated by a preset angle, from a uniformly rotating mirror or multifaceted prism placed at the focus at a lens.

Zanoni in U.S. Pat. No. 3,961,838 discloses an apparatus for producing a scanning laser beam of constant linear velocity by reflecting a laser beam from a uniformly rotating mirror.

Zanoni in U.S. Pat. No. 3,856,411 discloses an optical device in which a beam of laser light is reflected from a rapidly oscillating mirror and scanned across a test object to determine the diameter of the test object.

Barker et al. in U.S. Pat. No. 4,101,612 disclose an optical method and apparatus for measuring stress relaxation, including monitoring the dimensions of a material (extrudate) using optical means for scanning the extrudate. Their apparatus measures the diameter of a strand as it passes within an aperture.

Parkinson in U.S. Pat. No. 3,829,220 discloses a "profile gauge," which measures the width of an object by scanning two beams across the object.

Loy in U.S. Pat. No. 3,992,017 discloses an apparatus and method for detecting, measuring, and controlling the preselected width of a continuously moving web of material. The apparatus may include optical position sensing together with feedback control.

Other optical, non-contact measurement schemes have been disclosed by Dehait, in U.S. Pat. No. 4,097,158, Petrohilos, in U.S. Pat. No. 3,765,774, and Asar et al., in U.S. Pat. No. 3,854,052.

None of the methods and apparatus of the prior art have been directed to the unique problems posed by maintaining the gap between a metal-casting crucible orifice and an adjacent chill surface.

SUMMARY OF THE INVENTION

The present invention provides an improved apparatus for flow casting metal strip of the type that includes, in combination, a crucible for holding molten metal; a movable chill body, providing a chill surface for deposition thereon of the molten metal for solidification; and an orifice, through which the molten metal may pass across a gap from the crucible to the chill surface. The improvement comprises means for setting a desired value for the gap; gap measurement means, including a light source for providing a focused light beam, beam-shifting means for continually scanning the beam across the gap, and detection means for sensing the time-varying intensity of the light beam after it has passed through the gap; comparator means for comparing the measured gap with the desired gap and generating a deviation signal proportional to the difference; and means for adjusting the crucible position in response to the deviation so as to minimize the deviation signal.

In operation, the invention provides an improved method for flow casting metal strip of the type in which molten metal is passed from a crucible, through an orifice, across a gap, and onto the rapidly moving surface of a chill body. The improvement comprises controlling the gap between the orifice and the chill body surface by setting a desired value for the gap; measuring the gap by providing a focused light beam, continually scanning the gap with the light beam by passing the light through a rotating beam-shifting means, and measuring the time-varying intensity of the light beam after it has passed through the gap; comparing the measured gap with the desired gap and generating a deviation signal that indicates whether there is a difference between the measured and desired values; and adjusting the crucible position in response to the deviation signal so as to minimize the difference.

The invention, by automatically providing a constant gap between the crucible orifice and chill surface, permits the casting of strip having uniform thickness.

BRIEF DESCRIPTION OF THE DRAWINGS

FIG. 1 is a schematic view of a gap measurement system of the present invention.

FIG. 3 is a front view of a metal casting apparatus of the present invention.

FIG. 4 is a top view of a dual-beam gap control system.

FIG. 5 is a top view of another dual-beam gap control system.

DETAILED DESCRIPTION OF THE INVENTION

Figure 2:
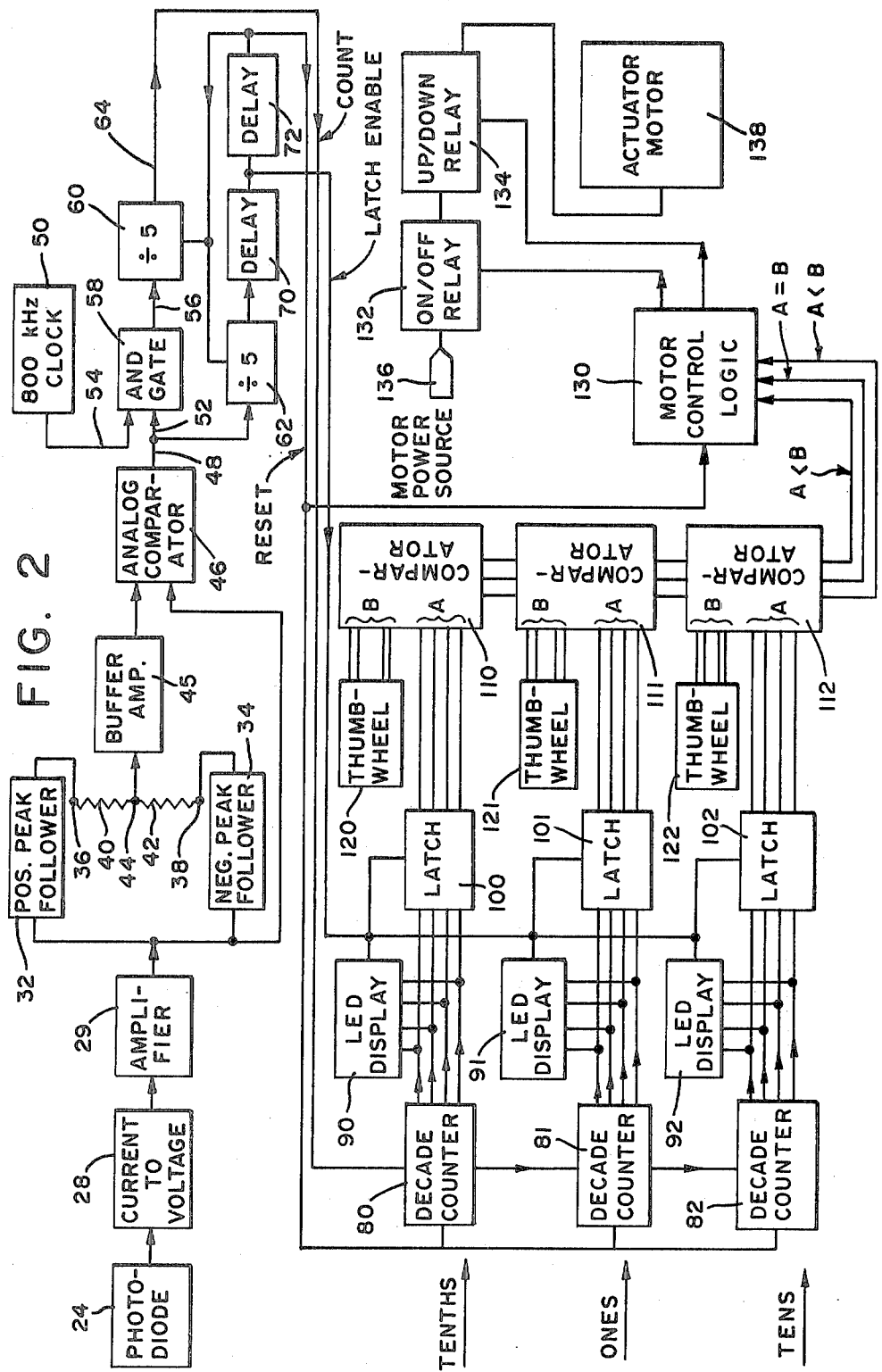
FIG. 2 is a schematic of a signal processing system of the present invention.

A method is provided for remotely measuring and controlling a gap between a metal casting crucible orifice and a rapidly moving chill surface.

A light source provides a light beam, which is continually scanned across the gap by a rotating beam-shifting means. Any light source that can provide a suitable intensity of light may be used, but a laser, such as a helium neon laser, is preferred. When a laser is used, a beam expanding system is preferably used as well. The beam expander may be an optical system comprising defocusing and focusing elements, such as concave and convex lenses or mirrors.

The shifting means for the light beam comprises a transparent optical material having at least two parallel faces and rotating about an axis normal to the propagation direction of the light beam. The parallel faces are preferably about equidistant from the rotation axis. Preferred materials for the shifting means include optical glasses that are stable against laser damage. Preferably, the faces are well polished and have a deviation from parallelism of less than 150 microradians. Preferably, the surface of the glass element is flat to better than half of a wavelength of the light employed.

Since opaque molten metal fills the central portion of the gap during casting, the beam scans the gap between an edge of the crucible orifice and points on the chill surface that lie beside the central section.

A detector senses the light beam after it has passed through the gap. Preferred detectors include photodiodes, photoconductive devices, and photomultiplier tubes. These detectors respond to light by generating an electrical signal. Optionally, a filter may be located in front of the detector to pass the light from the source and eliminate background light.

The time-varying signal from the detector yields a current that depends on the light intensity. A signal processing unit converts this time-varying current to the gap measurement.

The signal processing unit may include a current-to-voltage converter connected to the detector, a positive and a negative peak follower connected to the current-to-voltage converter, a resistive network connected to the positive and negative peak followers for providing an average detection level, and an analog comparator connected to the resistive network and to the current-to-voltage converter for comparing the average detection level with the signal. Preferably, the outputs of the comparator and a high-frequency source are connected to the inputs of an AND gate, and a counter is connected to the output of the AND gate. The counter output may be shown on a display. Preferably, a reset is connected to the counter for periodically resetting the counter to zero.

By the method of this invention, a gap is measured by continually sweeping a light beam across the gap at a known constant velocity. A detector senses the light beam after it passes through the gap and generates a time-varying signal proportional to the beam intensity. Knowing the beam sweep velocity, the gap may be determined from the detector signal.

The gap is controlled by setting a desired value and comparing this value with the measured value in a digital comparator. This comparator generates a deviation signal that indicates whether there is a difference between the measured and desired values, and the deviation signal, in turn, controls an actuator. The actuator adjusts the crucible position so as to reduce the deviation of the gap from the desired value.

The comparison between the desired and measured gap values is performed by digital circuitry. The desired value can be adjusted by employing conventional switches.

The comparison circuit can be protected from spurious signals by latches placed between counter and digital comparator. The comparison circuit may comprise several parallel stages; e.g., one stage for each decimal position.

The output of the comparator may be fed to a motor control logic circuit for processing. The circuit may include, e.g., integrating, differentiating, rate, proportional, and statistical processing circuits. The output of the logic circuit, or the output of the comparator directly, is fed to an on/off relay for switching a current to the actuator and to an up/down relay for establishing the direction of the correcting motion.

A power source provides another input to the dual-relay stage, and the output is connected to an actuator motor that drives the crucible up and down.

Controlling the casting gap at a single point, as described above, does not ensure that the gap will be uniform across the width of the chill surface. Specifically, the bottom surface of the orifice may not be aligned parallel to the chill surface. To eliminate the problem, which is more severe when wide strip is being cast, the gap may be controlled at two points, preferably on the short sides of a generally rectangular orifice whose long sides are oriented generally perpendicular to the direction of motion of the chill surface. A preferred embodiment of this "dual-beam" control system comprises means for setting a desired value for the gap; gap measurement means, including a light source for providing a focused light beam at each of the short sides of the orifice, beam-shifting means for continually scanning the beams across the gap at the short sides of the orifice, and detection means for sensing the time-varying intensities of the light beams after they have passed through the gap; means for comparing each measured value with the desired value and generating deviation signals that indicate any differences; and means for translating the crucible in response to one deviation signal and rotating the crucible, about an axis parallel to the direction of travel of the chill surface, in response to the other deviation signal, so as to minimize the differences.

Where two light beams are used to control the crucible position, the light beams may be provided by two independent lasers, with each beam passing through a separate beam shifter; or, alternatively, the beams may be provided by a single laser, with a beam splitter positioned between the shifting means and the gap.

In operation, the dual-beam embodiment provides an improved flow casting process that involves casting from a generally rectangular orifice oriented with its long sides generally perpendicular to the direction of motion of the chill surface. The improvement comprises setting a desired value for the gap; measuring the gap by providing two focused light beams, continually scanning the gap with a light beam at each of the two shorter sides of the rectangular orifice, and measuring the time-varying intensities of the light beams after they have passed through the gap; comparing each measured value with the desired value and generating deviation signals that indicate any differences; and translating the crucible in response to one deviation signal and rotating the crucible, about an axis parallel to the direction of travel of the chill surface, in response to the other deviation signal, so as to minimize the differences.

FIG. 1 shows the elements of a laser beam generating, focusing, and sweeping system. A laser 12 generates a collimated beam 14. Beam 14 passes through a beam expander, which consists of two lenses 16 and 18. The lenses give a beam expansion of about 5 times and permit the beam to be focused to a suitably small spot. The beam is focused on the gap by varying the spacing between the lenses. After passing through the beam expander, the light beam passes through beam-shifting element 20, which rotates about an axis perpendicular to the optical axis and causes the outgoing beam to be shifted relative to the incoming beam.

The displacement, disp, between an incoming and an outgoing light ray is proportional to the angle of rotation of the element for small rotational angles, as is shown by the following equations, where $\theta$ is the angle between the incident beam and the normal to the incident plane; $\theta'$ is the angle between the beam inside the glass element and the normal to the incident plane; h is the thickness of the element in the direction of beam propagation; n is the index of refraction of the ambient; and n' is the index of refraction of the element.

$$\text{disp} = (h/\cos \theta') \sin (\theta - \theta')$$

$$n \sin \theta = n' \sin \theta'$$

For small angles, $\cos \theta' \approx 1$ and $\sin \theta \approx \theta$ $$\therefore n\theta \approx n'\theta'$$

$$\text{disp} \approx h(\theta - \theta') \approx h\theta(1 - (n/n'))$$

$$d(\text{disp})/dt \approx h(d\theta/dt)(1 - (n/n'))$$

Thus, for small angles, the beam velocity is very nearly proportional to the rotational velocity $d\theta/dt$.

The element is rotated by a constant speed motor such that the beam sweep velocity is essentially constant over the gap. One pair of parallel faces on the shifting element provides two beam sweeps per revolution, and a rod, having at least two parallel faces, is suitable. However, a solid having at least three pairs of parallel faces (i.e., at least six sweeps per revolution) is preferred. For the system to operate optimally, the spot size is preferably smaller than the gap to be measured.

After passing through the gap 22, the laser beam passes through optional narrow-bandpass filter 26 and is intercepted by a photodiode 24. Filter 26 passes laser beam 14 and blocks light from other sources to maximize the signal-to-noise ratio at the detector.

The signal produced by the photodiode is processed by the circuitry shown in FIG. 2. Photodoide 24 produces a current proportional to the incident light intensity. The photodiode output is converted to a voltage signal by a current-to-voltage converter 28 and amplified in amplifier 29. Since the focused laser beam has a finite diameter, when the beam crosses the edges of gap 22, the light intensity falling on photodiode 24 has small but significant rise and fall times. The width of the pulse is measured at the 50% amplitude points. These points are determined by the positive 32 and negative 34 peak followers. The output voltage of the positive peak follower equals the most positive level of the signal from the photodiode amplifier, and the negative peak follower 34 equals the most negative level. These two voltage levels are connected to the opposite ends, 36 and 38, of a voltage divider formed by identical resistors 40 and 42. The voltage at the center 44 of the divider is thus midway between the two input voltages. For example, if the most positive and most negative voltage levels from the photodiode amplifier are +6 V and +1 V, the output from the voltage divider is 3.5 V. The output is amplified in buffer amplifier 45.

This signal and the signal from the photodiode amplifier ae compared in analog comparator 46, which produces an output pulse having short rise and fall times. Output 48 is high if, and only if, the voltage from the photodiode amplifier exceeds that determined by the positive and negative peak followers and the voltage divider. As a result, a square-edged pulse is produced that has the same time duration as the photodiode pulse measured at the 50% amplitude points.

Output 48 is used to gate pulses from a pulse generator 50. The output of the analog comparator is connected to one input 52 of a two-input AND gate 58, and a continuously running pulse generator 50 is connected to the other input 54. When the signal from comparator 46 is high, the pulses from pulse generator 50 are transmitted to the output 56 of AND gate 58. Thus, for a given pulse generator frequency, the number of pulses from pulse generator 50 passed to the output 56 of AND gate 58 is a measure of the gap width. For good measurement resolution, the frequency is chosen high enough to provide a large number of pulses during the "open" period of the gate.

A divider 60 is connected to AND gate 58, and a divider 62 is connected to the output 48 of comparator 46. Divider 60 provides an output pulse for every five input pulses. Divider 62 allows decade counters 80, 81, and 82 to sum the pulses from five consecutive beam sweeps before resetting the counters to zero. Delay units 70 and 72 are connected to dividers 60 and 62 to provide suitable timing of input pulses for decade counters 80, 81, and 82, which count the pulses. The output of the decade counters is displayed on displays 90, 91, and 92. By appropriate choice of beam sweep speed and clock rate, the number displayed is the gap width in an appropriate unit. The outputs of the three decade counters, 80, 81, and 82, represent the gap measurement in BCD (binary coded decimal) format. One counter is for tenths of a mil (0.0025 mm), the second is for ones, and the third is for tens. Besides being presented to the inputs of three LED displays, these outputs are connected to the inputs of three latches, 100, 101, and 102, which serve as buffers to prevent spurious signals from being transmitted to digital comparators 110, 111 and 112. The outputs of these latches, which still represent the measured gap in BCD format, are connected to one set of inputs (the A inputs) on the three digital comparators. The signals on the other inputs (the B inputs) of the comparators come from three thumbwheel switches, 120, 121, and 122. These thumbwheel switches are set to the desired gap, and their output is the desired gap in BCD format.

Digital comparators 110, 111, and 112 determine whether the signal applied to the A inputs, which represents the measured gap, is less than, greater than, or equal to the signal applied to the B inputs, which represents the desired gap. The output of the comparators is in one of three states (A<B, A>B, or A=B). This output information is sent to an optional up/down motor control logic circuit 130, which determines whether the crucible should be raised, lowered, or neither. The measured gap is the average of five consecutive gap measurements. If the gap is scanned sixty times per second, a readily achieved scanning frequency, the comparator output could change up to twelve times per second.

Variations in the gap measurement, caused by wheel runout, vibration, and disturbance of the laser beam as it passes through the hot gases in the gap, may cause the signal to the A inputs of the comparators to fluctuate by ±0.0025 to 0.0050 mm. If the comparator outputs were used directly to control actuator motor 136, the motor would rapidly cycle on and off, up and down in a more-or-less random fashion. To minimize this random motion, the motor control logic stage 130 decides whether or not gap correction is necessary. If a gap correction is necessary, relays 132 and 134 connect power source 136 to actuator 138.

Motor control logic stage 130 operates as follows. If A=B, no action is taken and the motor is not energized.

If four or more consecutive gap measurements are similar; i.e., A<B or A>B for four consecutive measurements, the motor is activated in the appropriate direction to bring the gap into agreement with the desired gap. Thus, if four consecutive measurements indicate that A>B, the motor is turned on to bring the crucible down to decrease the gap width. If only three consecutive measurements indicate that A>B, and the fourth indicates A=B or A<B, no action is taken. Similar logic applies to the case A<B.

The logic circuit essentially acts as a filter to distinguish between random, spurious signals and the true gap measurement. In doing so, the logic circuit introduces an inevitable time delay before acting. Since no action is taken until four consecutive similar comparisons are received, motor response is delayed by three-twelfths (or one-fourth) of a second. However, the overall response time of the gap control system is adequate to compensate for thermally-induced gap changes, which are relatively slow.

Several features may be incorporated into the gap control system. In addition to a set of thumbwheel switches, manual and automatic push buttons may be used to energize or turn off the automatic gap control system. Pushing the automatic button causes an electromagnetic clutch to close, connecting the actuator motor to a vertical lead screw, and the gap is then controlled by the control system. Pushing the manual button disengages the clutch and turns off the control system. Several safety features are incorporated into the system. A separate, manually operated switch in the leads going to the clutch is available to disconnect the motor from the lead screw. The absence of pulses from the laser beam detector, which could be caused by something obscuring the laser beam, for a period of about 0.5 s or more automatically disengages the automatic system. In addition, circuitry prevents the system from reducing the gap to less than about 0.175 mm, even if the thumbwheel switches are inadvertently set at less than that value.

FIG. 3 shows a front view of a metal casting apparatus of the present invention. Actuator 138 controls the position of crucible 140 relative to chill body 142. Molten metal 144 passes from orifice 146 at the bottom of crucible 140 across gap 22 to the rapidly moving surface 148 of chill body 142, where it solidifies into strip 150. Chill body 142 may be a wheel or another chill body known in the art, such as an endless belt.

The gap is measured at 22a, between the edge of orifice 146 and points on chill surface 148 that lie outside the central section of gap 22. In the dual-beam apparatus, two beams scan the gap, one at 22a and the other at 22b. Also, in the dual-beam apparatus, actuator 138 includes means both for moving crucible 140 vertically and for rotating the crucible about a horizontal axis paralled to the direction of chill surface travel (i.e., normal to the plane of FIG. 3). Thereby, the gap at both 22a and 22b can be adjusted to the desired value.

Top views of two embodiments of dual-beam control systems are depicted in FIGS. 4 and 5, where crucible 140 has been cut away for clarity. In FIG. 4, laser 12 provides a beam 14 that, after passing through beam-shifting element 20, is split by beam splitter 152 and mirror 154 into two parallel beams. Beam 14a scans the gap at 22a and is detected by detector 24a. Beam 14b scans the gap at 22b and is detected by detector 24b. The translation and rotation of crucible 140 are each controlled by the methods described above and depicted in FIG. 2.

In FIG. 5, lasers 12a and 12b provide beams that are independently shifted by beam shifters 20a and 20b to scan the gap at 22a and 22b, respectively. Detectors 24a and 24b detect the beams and generate a current that, by the methods described earlier, control translation and rotation of crucible 140 so as to keep the gap value at or near the desired value at both 22a and 22b.

EXAMPLE

The apparatus shown in FIGS. 1 and 2 was employed. The laser was a helium neon laser operating of a wave length of 632.8 nm. The diameter of the laser beam was about 1 mm.

The first lens was biconcave with focal length of $-5$ mm, and the second lens was a plano-convex lens of 25 mm focal length. The beam-shifting element was a rod of crown glass with an index of refraction of 1.521, and the opposite faces of this element were flat and parallel to each other. The length "t" of the element was 31.47 mm, and the element was rotated at 30 rps by a hysteresis synchronous motor. The resulting beam sweep velocity was 2.03 m/s and was essentially constant over a distance of 2.5 mm. Since two beam sweeps were generated for one revolution of the glass element, the beam swept across the gap sixty times per second.

For a beam focused at a point 380 mm from the beam expander, the minimum spot size was about 0.125 mm. The range of gaps that could be measured accurately was about 0.125 to 2.5 mm. A filter, having a center wavelength of 632.8 nm, the HeNe laser wavelength, passed the laser beam and blocked light from other sources to maximize the signal-to-noise ratio at the photodiode detector.

The width of the pulse generated by the photodiode was measured at the 50% amplitude points. By using an 800 kHz generator frequency, the number of pulses passed by the AND gate corresponded to 10 times the gap measured in thousandths of an inch. For example: for a 304.8 $\mu$m gap and a beam sweep velocity of 2.03 m/s, the pulse duration from the comparator was $1.5 \times 10^{-4}$ s. At $8 \times 10^5$ pulses per second, 120 pulses were passed through the AND gate. This number was 10 times the gap measured in thousandths of an inch. The decimal point in a three-digit display was positioned between the center and right-hand digit, thus indicating the gap in thousandths of an inch. For example, a count of 147 pulses was displayed as 14.7. The least significant digit represented tenths of thousandths of an inch.

The measured gap, A, was provided in BCD format as described above, and the desired gap, B, was set by a thumbwheel switch (typically at between 0.175 mm and 0.375 mm). The two values were compared by a digital comparator, which determined whether A<B, A=B, or A>B. A motor control logic circuit controlled the actuator by the method described above.

The actuator was a reversible motor that drove a vertical lead screw through an electromagnetic clutch and a toothed belt. The motor, when energized, ran at a constant speed. The speed could be adjusted to optimize the response of the control system. It was found that a speed of 0.03 mm/s was the maximum speed that was practical without overshoot and instability problems. At that speed, the system responded adequately to slowly-varying, thermally-induced gap changes.

I claim:

1. In an improved apparatus for flow casting metal strip of the type that includes, in combination:
   a crucible for holding molten metal;
   a movable chill body, providing a chill surface for deposition thereon of the molten metal for solidification; and
   a generally rectangular orifice, through which the molten metal may pass across a gap defined by the distance from the crucible to the chill surface, long sides of the orifice oriented generally perpendicular to the direction of motion of the chill surface, the improvement comprising:
   (a) means for setting a desired value for the gap;
   (b) gap measurement means, including a light source for providing a focused light beam at each of two short sides of the orifice, beam-shifting means for continually scanning the beams across the gap at the short sides of the orifice, and detection means associated with the beam shifting means for sensing time-varying intensities of the light beams after they have passed through the gap;
   (c) means associated with said detection means for comparing measured values of the time-varying intensities of the light beams with desired values and for generating, in response to a comparison of the measured and the desired values, deviation signals that indicate any differences; and
   (d) means associated with said comparison means for translating the crucible perpendicular to the direction of travel of the chill surface in response to one deviation signal and for rotating the crucible, about an axis parallel to the direction of travel of the chill surface, in response to another deviation signal, so as to minimize the differences.

2. The apparatus of claim 1 wherein the beam-shifting means comprises a rod having at least two parallel faces.

3. The apparatus of claim 1 wherein the beam-shifting means comprises a solid having at least three pairs of parallel faces.

4. The apparatus of claim 1 wherein the means for translating and rotating the crucible comprises:
   (a) a power source;
   (b) actuator means for adjusting the crucible position; and
   (c) relay means, activated by the deviation signals, for passing current from the power source to the actuator means.

5. The apparatus of claim 4 further comprising a motor control logic circuit interposed between the comparator means and the relay means.

6. The apparatus of claim 4 wherein the relay means is an on/off relay and an up/down relay, arranged in series, for passing the current from the power source to the actuator means.

7. The apparatus of claim 4 wherein the actuator means is a motor.

8. The apparatus of claim 1 wherein the light beams are provided by a single laser and a beam splitter positioned between the beam-shifting means and the gap.

9. The apparatus of claim 1 wherein the light beams are provided by two lasers, and the beam from each laser passes through a separate beam-shifting means.

10. In an improved method for flow casting metal strip onto the rapidly moving surface of a chill body of the type in which molten metal is passed from a crucible, through a generally rectangular orifice oriented with long sides generally perpendicular to the direction of motion of the chill surface, across a gap defined by the distance between the crucible and the chill surface, and onto the chill surface, the improvement comprising:
    (a) setting a desired value for the gap;
    (b) providing a gap measurement means, including a light source for providing a focused light beam at each of the two short sides of the orifice, beam-shifting means for continually scanning the beams across the gap at the short sides of the orifice, and detection means associated with the beam shifting means for sensing time-varying intensities of the light-beams after they have passed through the gap:
    (c) measuring the gap by providing the two focused light beams, continually scanning the gap with the light beams and measuring the time-varying intensities of the light beams after they have passed through the gap;
    (d) comparing measured intensity values of the light beams with desired values and generating, in response to a comparison of the measured and the desired values, deviation signals that indicate any differences; and
    (e) translating the crucible perpendicular to the direction of travel of the chill surface in response to one deviation signal and rotating the crucible, about an axis parallel to the direction of travel of the chill surface, in response to another deviation signal, so as to minimize the differences.

* * * * *